(12) United States Patent
Starksen

(10) Patent No.: US 8,607,955 B2
(45) Date of Patent: Dec. 17, 2013

(54) RELEASE FOR PULL TYPE CLUTCH MECHANISM

(75) Inventor: Dirk Starksen, Lancaster, CA (US)

(73) Assignee: Advanced Clutch Technology, Inc., Lancaster, CA (US)

( * ) Notice: Subject to any disclaimer, the term of this patent is extended or adjusted under 35 U.S.C. 154(b) by 43 days.

(21) Appl. No.: 13/310,908

(22) Filed: Dec. 5, 2011

(65) Prior Publication Data

US 2013/0140129 A1    Jun. 6, 2013

(51) Int. Cl.
 *F16D 23/14*    (2006.01)
(52) U.S. Cl.
 USPC ............................. 192/98; 192/89.24
(58) Field of Classification Search
 None
 See application file for complete search history.

(56) References Cited

U.S. PATENT DOCUMENTS

| | | | |
|---|---|---|---|
| 4,588,061 A | * | 5/1986 | Mallet .............................. 192/98 |
| 4,632,237 A | * | 12/1986 | Maycock et al. ............... 192/98 |
| 4,903,807 A | | 2/1990 | Kabayama et al. |
| 5,240,097 A | * | 8/1993 | Kajitani et al. ............... 192/89.1 |
| 5,758,757 A | | 6/1998 | Hashimoto |
| 2005/0236250 A1 | * | 10/2005 | Riess .............................. 192/98 |

\* cited by examiner

*Primary Examiner* — David D Le
*Assistant Examiner* — Mark Manley
(74) *Attorney, Agent, or Firm* — Greenberg Traurig, LLP

(57) ABSTRACT

A release mechanism for a pull-type clutch assembly, including a throw-out bearing with an inner cylindrical portion extending in a direction axially inwardly of the clutch assembly. A retaining basket is provided having a flat annular ring portion surrounding an opening receiving the cylindrical portion of the bearing therethrough, the basket having a ring with an inner and outer surface spaced from the annular portion, the ring being comprised of a plurality of spaced sections interconnected to the annular portion by spaced segments integral with the ring and the annular portion, the segments being separated from one another by cut-out portions. A pressure plate having a central opening receives the basket therein, the pressure plate having a plurality of radially extending resilient fingers extending outwardly from the central opening and a clutch disk is disposed adjacent the pressure plate and in contact therewith being adapted to be coupled to the flywheel of a vehicle. The bearing has an outwardly extending annular groove into which the inner surface of the ring of the basket snap fits, and the pressure plate has an inwardly extending annular groove into which the outer surface of the ring snap-fits.

15 Claims, 7 Drawing Sheets

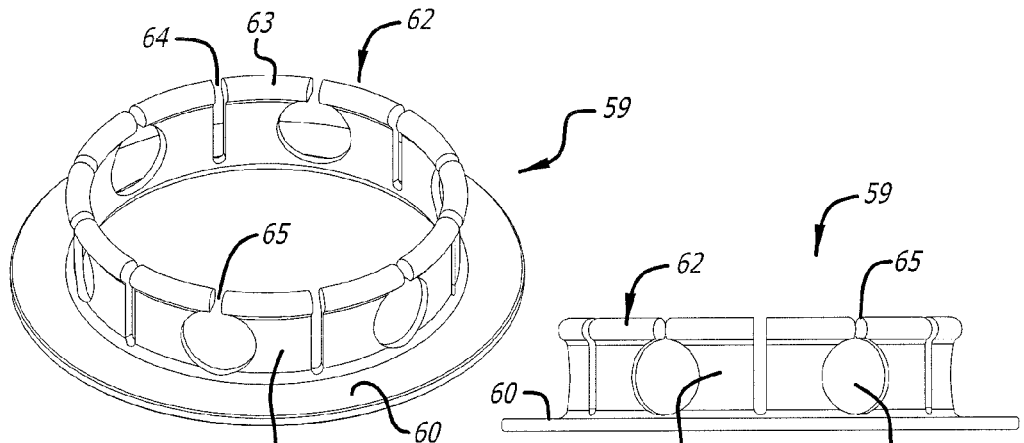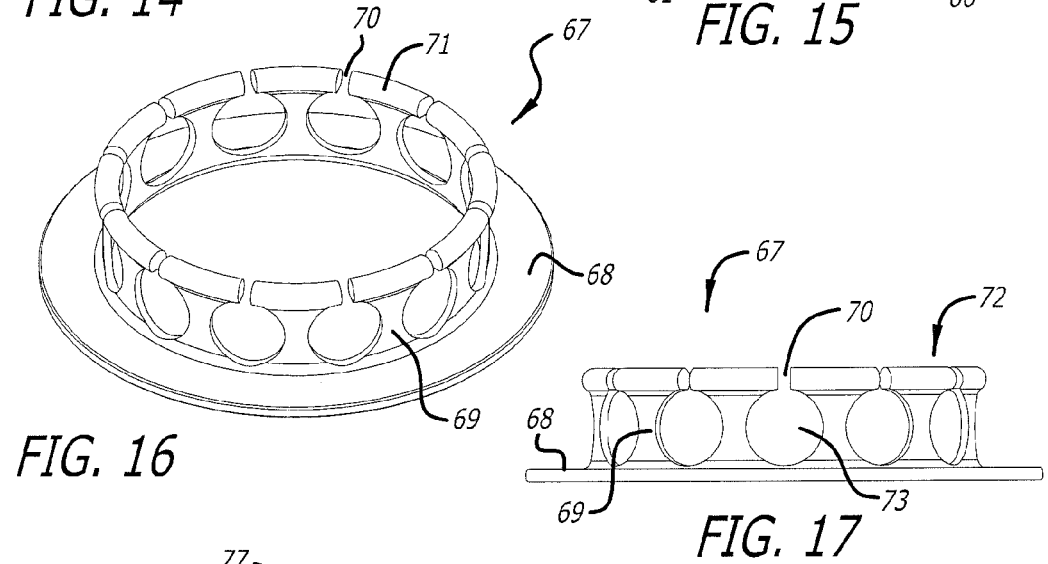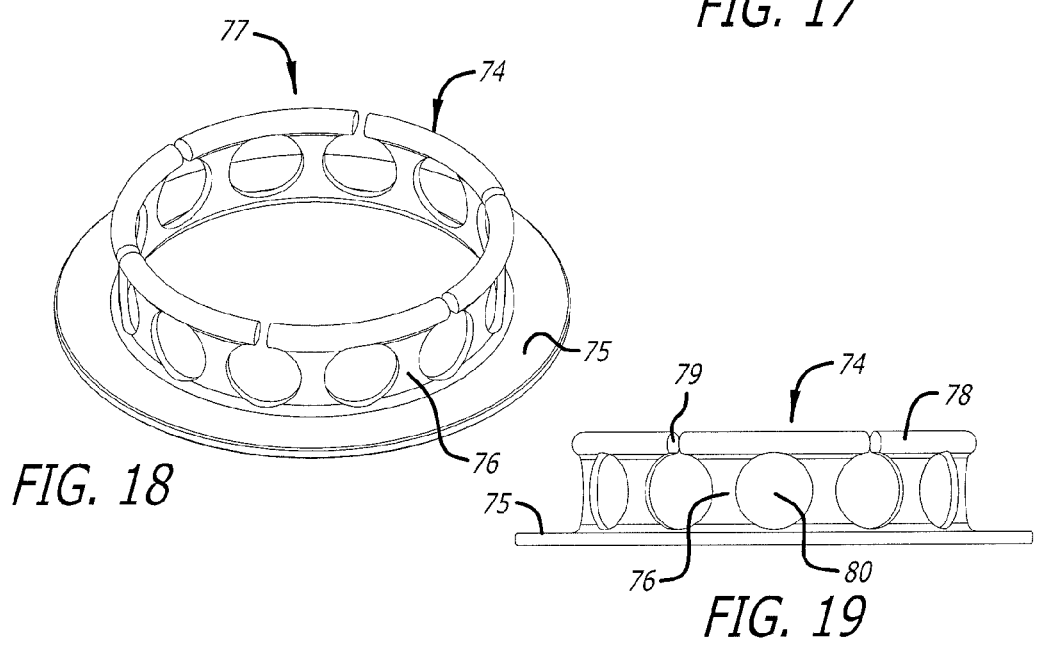

RELEASE FOR PULL TYPE CLUTCH MECHANISM

BACKGROUND OF THE INVENTION

1. Field

The invention relates to a release mechanism for a friction clutch used in automobiles.

2. Description of Related Art including Information Disclosed Under 37 C.F.R. 1.97 and 1.98

Pull type clutches are well known in the art. They generally include a release mechanism that pulls a radially inner portion of a diaphragm spring toward a transmission to disengage the clutch.

One such apparatus includes a pressure plate and one pushes on the clutch pedal to make it operate. The pressure plate is mounted to the engine and a release bearing is mounted to the pressure plate on the transmission side. The release bearing can be disengaged by pushing it and releasing the snap ring and inserting a screwdriver between the bearing and the pressure plate, thus releasing the same from the wedge collar. This releases the pressure plate from the transmission. However, in some designs, the snap ring retaining the wedge collar to the pressure plate expands in high RPM use applications. If one shifts very fast, under adverse conditions such as often experienced in racing, the bearing can jump out of place causing the snap ring to jump out of place and be exposed, damaging parts and resulting in breakdown of the clutch mechanism requiring removal of the transmission.

There is a need for improving the release bearing and snap ring so that the transmission can be secured to the pressure plate, operate under high RPM conditions or adverse conditions and be quickly and easily released from the pressure plate.

BRIEF SUMMARY OF THE INVENTION

It is an object of this invention to provide a release for a pull type clutch which operates in high RPM and other adverse conditions.

BRIEF DESCRIPTION OF THE SEVERAL VIEWS OF THE DRAWINGS

The above-mentioned features and objects of the present disclosure will become more apparent with reference to the following description taken in conjunction with the accompanying drawings wherein like reference numerals denote like elements and in which:

FIGS. 10, 12, 14, 16, 18, 20, 22 and 24 are perspective views of further modifications of the basket of FIG. 1; and FIGS. 11, 13, 15, 17, 19, 21, 23 and 25 are side views of the respective baskets of FIGS. 10, 12, 14, 16, 18, 20, 22 and 24.

DESCRIPTION OF THE PREFERRED EMBODIMENT

Figure 1:
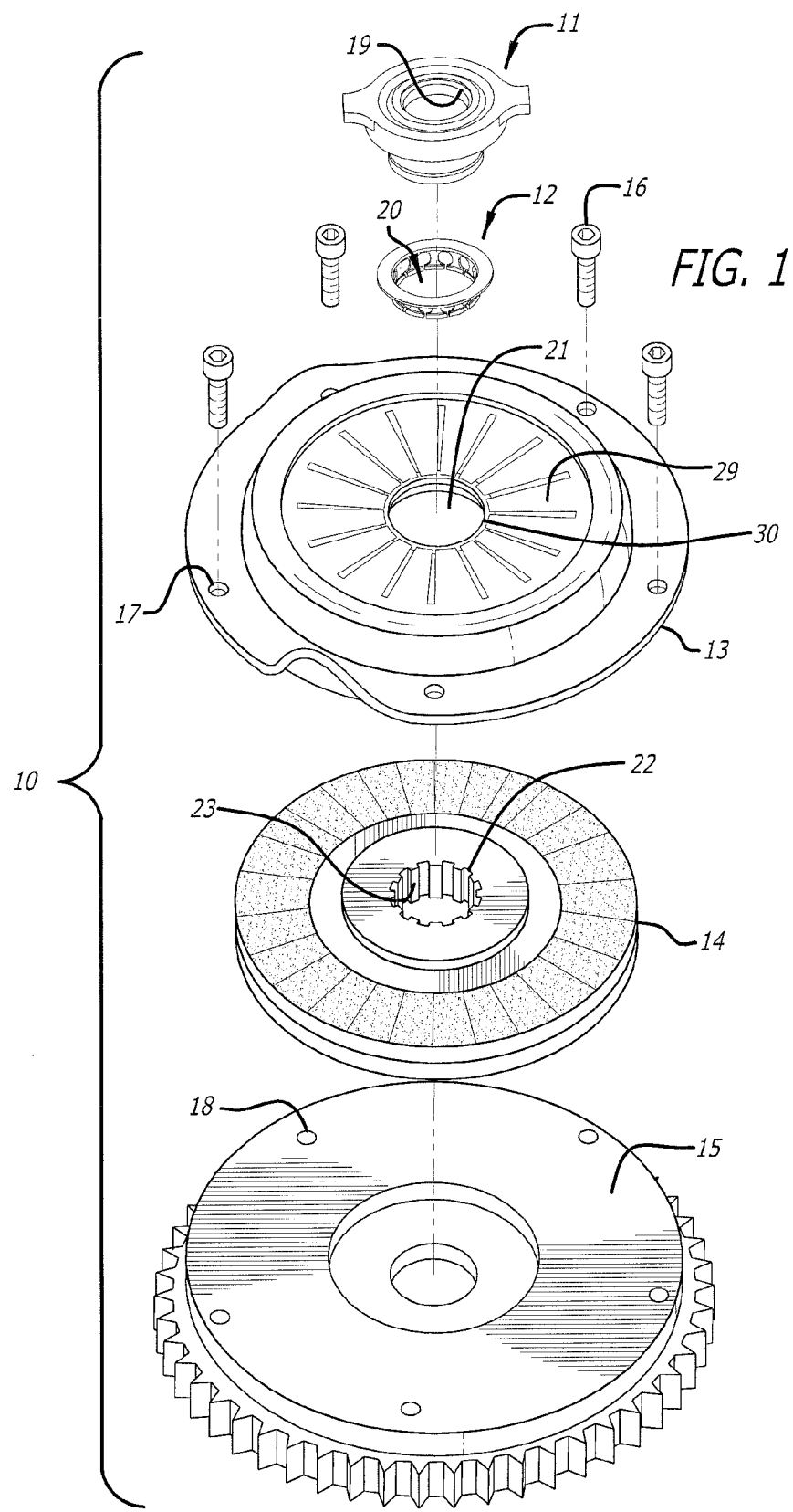
FIG. 1 is an exploded view of a pull type clutch mechanism in accordance with the teachings of the invention.

Clutch assembly 10 is shown in exploded view in FIG. 1. Assembly 10 includes a throw-out bearing 11, a retaining basket 12, a pressure plate 13, a clutch disk 14 and a flywheel 15.

Clutch assembly 10 is adapted to be secured to flywheel 15 using suitable bolts 16 extending through aligned holes 17, 18 in pressure plate 13 and flywheel 15 and then to the motor (not shown).

As is well known in the art, a spline shaft (not shown) extends from the vehicle transmission (not shown) through aligned holes 19 to 22 in bearing 11, basket 12, pressure plate 13 and flywheel 15 into engagement with spline 23 in hole 22 of the clutch disk 14.

Figure 2:
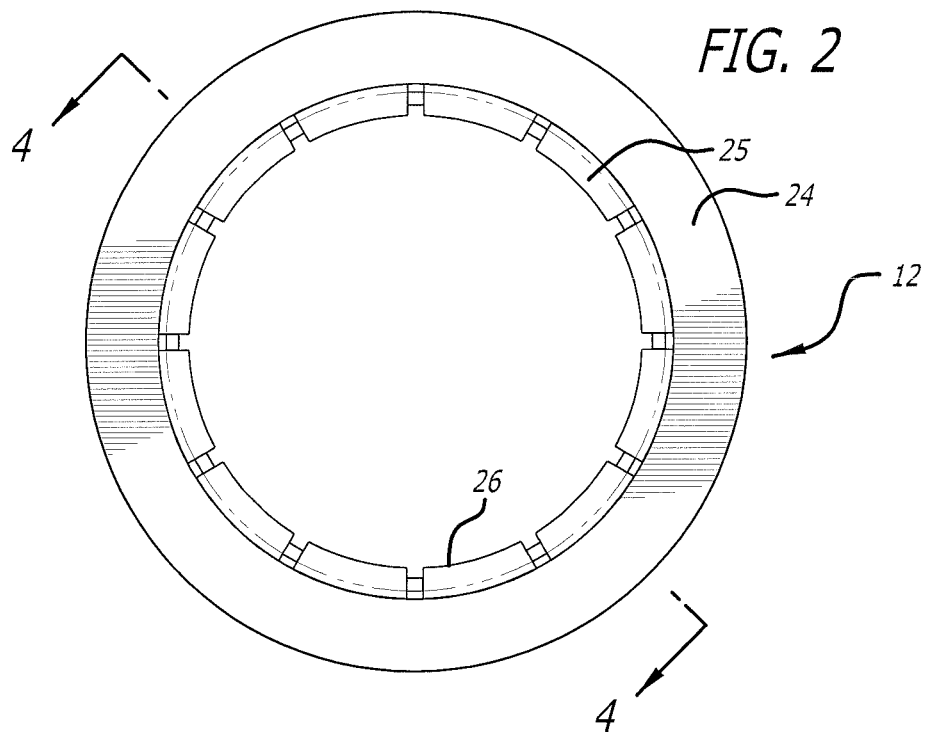
FIG. 2 is a top plan view of the retaining basket alone of the clutch mechanism of FIG. 1.

The retaining basket 12, as seen in FIG. 2, has a generally flat annular ring portion 24 with an integral split ring 25, of lesser diameter than ring portion 24.

Figure 3:
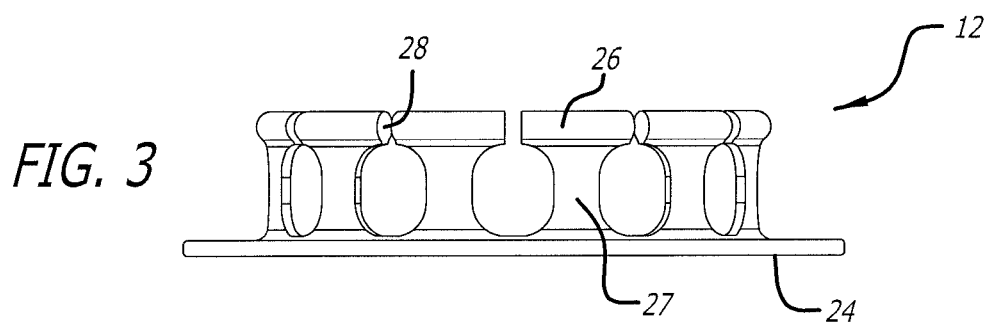
FIG. 3 is a side view of the basket of FIG. 2.
Figure 4:
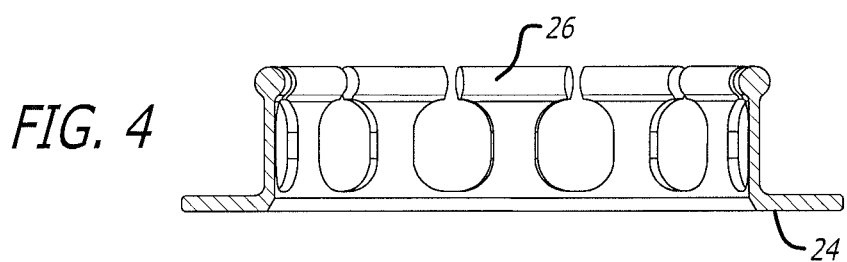
FIG. 4 is a view taken along lines 4-4 of FIG. 2.

As seen in FIGS. 2 to 4, ring portion 24 is formed of arcuate segments 26, one spaced from another by gaps 28. These segments 26 are integral with ring portion 24 by means of solid connecting portions 27.

These portions 27 are generally open and oval spaced from adjacent portions 27 and open at top communicating with gaps 28. This arrangement, as will be discussed, results in the maximum amount of ring 25 across the top or upper end of basket 12, as seen in FIGS. 3 and 4, with respect to the flexibility required to allow the basket 12 to snap into position as will be discussed.

Figure 5:
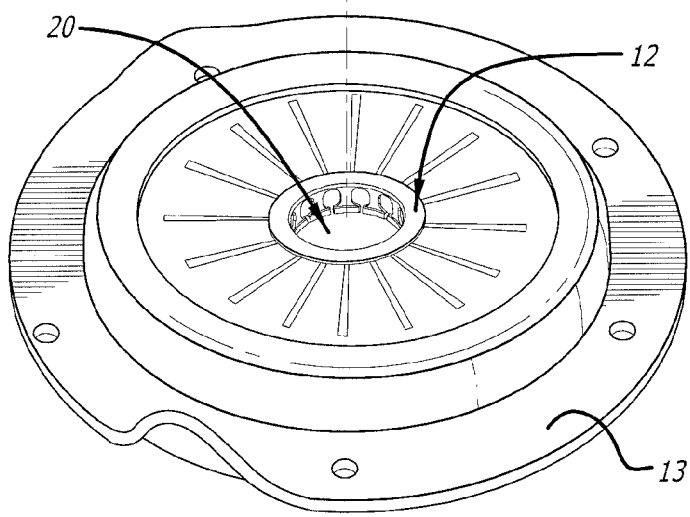
FIG. 5 is an exploded view illustrating the assembly of the throw out bearing of FIG. 1 to the retaining basket mounted to the pressure plate of FIG. 1.
Figure 7:
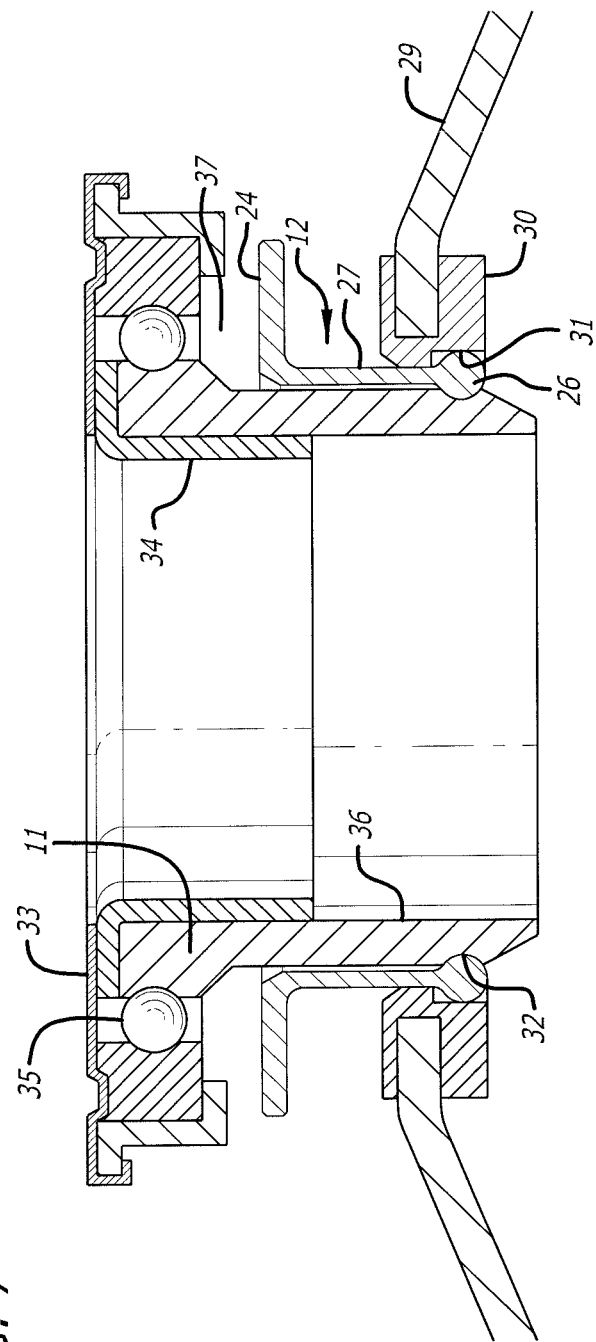
FIG. 7 is a cross-sectional view of the assembled parts in FIG. 6 mounted to the transmission and engine of a vehicle.

In assembly of basket 12 to pressure plate 13, as seen in FIG. 5, basket 12, the ring 25 facing downwardly in FIG. 5, is pressed down into hole 21 in pressure plate 13. Pressure plate 13 has a diaphragm spring 29 (FIG. 1) comprised of a plurality of resilient spaced fingers extending inwardly into collar 30 (FIG. 7). Collar 30 has an undercut 31 surrounding hole 21. Ring 26 snaps under undercut 31 as shown.

Figure 6:
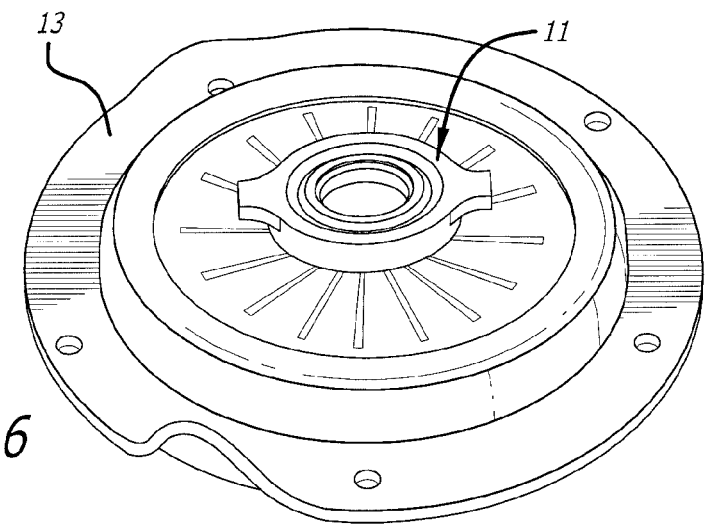
FIG. 6 is a plan view illustrating the assembly of the parts of FIG. 5.

Referring again to FIG. 5, throw-out bearing 11 is now press-fit down into the hole 20 through basket 12. The final installed position is shown in FIG. 6. However, as seen in FIG. 7, bearing 11 has a downwardly extending cylindrical portion 36 with an outer annular groove 32 into which ring 26 snap-fits. Bearing 11 terminates at top in a bracket 33 and the upper body portion 34 rotates with respect to cylindrical portion 36 by means of a ball bearing assembly 35 as is well known in the art.

Pressure plate 13 has an annular groove 31 into which ring 26 snap-fits as seen in FIG. 7.

In this manner, the throw-out bearing 11 is attached to the basket 12 and thus to the pressure plate 13. The bracket 33 of the throw-out bearing 11 is tied to the yoke of the transmission (not shown), as is well known in the art, and thus this pushes the bearing 11 in and out to activate the clutch (not shown).

When the bearing 11 is assembled to basket 12, as seen in FIGS. 6 and 7, it can rotate but cannot be pulled out. When it is desired to disengage the throw-out bearing 11 from basket 12, a screwdriver or similar tool (not shown) is inserted under throw-out bearing 11 (in the area 37 (FIG. 7) and the bearing 11 is pried up to release the same.

If desired, one or more annular spring washers (not shown) as is well known art may be disposed between the throw-out bearing 11 and collar 30, to take up any slop between the parts.

It can be seen that the parts illustrated in FIG. 1 can be quickly and easily assembled. When the retaining bracket 11 is released from the pressure plate 13, the entire assembly can be disengaged from the transmission.

Figure 8:
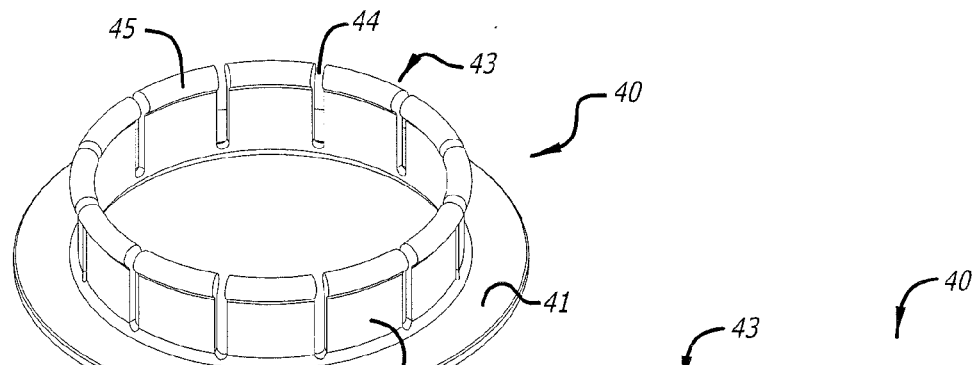
FIG. 8 is a perspective view of a modified retaining basket in accordance with the teachings of the invention.
Figure 9:
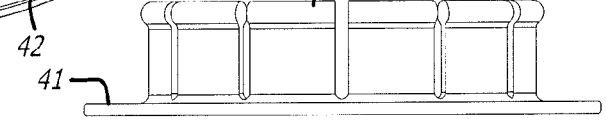
FIG. 9 is a side view of the bracket of FIG. 8.

Although a preferred configuration for the retaining basket 11 is disclosed, variations thereof may occur to an artisan. Thus, as shown in FIGS. 8 to 25, and more particularly to FIGS. 8 and 9, a first modified basket 40 is shown having a flat annular ring portion 41 with a plurality of spaced segments 42 integral with ring portion 41 and terminating in a ring 43 (similar to ring 26) comprising of arcuate portions 45 separating by gaps 44. The segments 42 are generally rectangular.

Figure 10:
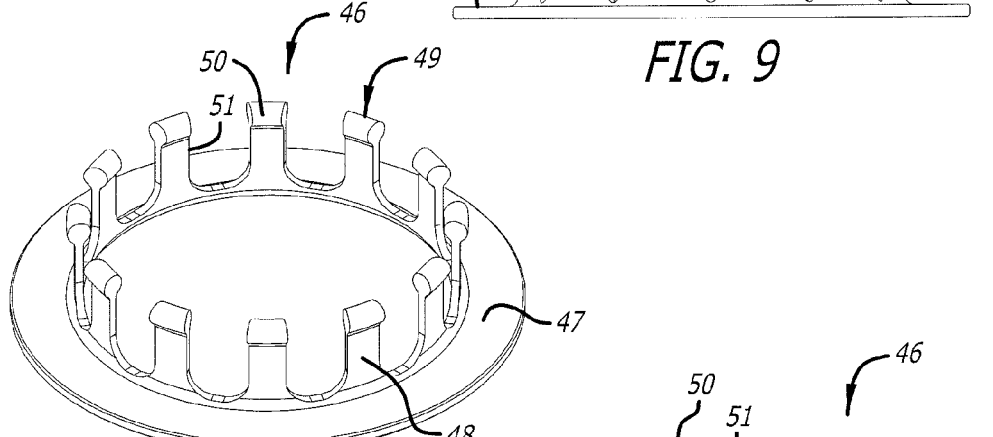
Figure 11:
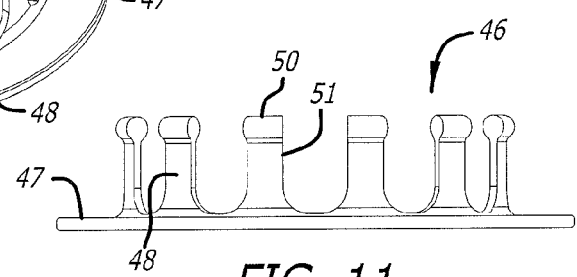

Another embodiment is shown in FIGS. 10 and 11. Here, basket 46 has a flat annular ring portion 47 and a plurality of spaced segments 48 integral with ring portion 47 terminating in a ring 49. Ring 49 is formed of spaced portions 50, which may be slightly arcuate, separated by gaps 51. It is noted that segments 48 are elongated rectangles and the gaps 51 are wider than gaps 44 in FIG. 8.

Figure 12:
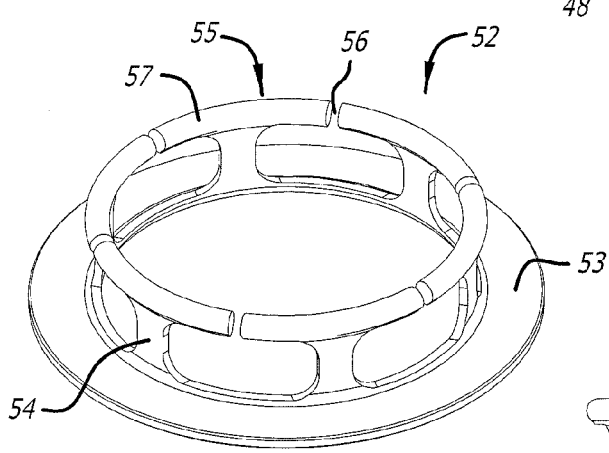
Figure 13:
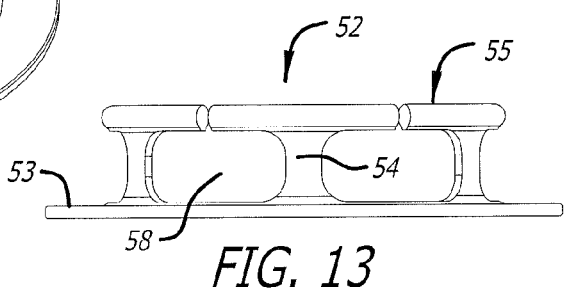

Another retaining basket embodiment is shown in FIGS. 12 and 13. Here, basket 52 also has a flat annular ring portion 53 and a plurality of spaced segments 54 terminating in a ring 55. It is noted that the gaps 56 between the arcuate segments 57 forming ring 55 communicate with an oval-shaped opening 58 between adjacent segments 54.

Another retaining basket embodiment is shown in FIGS. 14 and 15. Here, basket 59 has a flat annular ring portion 60 with a plurality of spaced segments 61. Segments 61 terminate in a ring 62 comprising of spaced arcuate segments 63 separated by gaps 64, 65. Gaps 64 are elongated slots and gaps 65 communicate with rounded openings 66 between adjacent segments 61. A pair of such segments 61 having openings 66 therebetween are separated by elongated gaps 64.

Another variation of the retaining basket is shown in FIGS. 16 and 17. Here, basket 67 has a flat annular ring portion 68 with integral spaced segments 69. A gap 70 separates the arcuate ring segments 71 forming ring 72. Generally, circular openings 73 communicating with gaps 70 are provided between adjacent segments 69.

Another basket embodiment is shown in FIGS. 18 and 19. Here, basket 74 has a flat annular ring portion 75 with integral spaced segments 76 terminating in a ring 77. Ring 77 is formed of curved portions 78 separated by gaps 79. Gaps 79 communicate with generally circular openings 80 between adjacent segments 76.

Figures 20, 21:
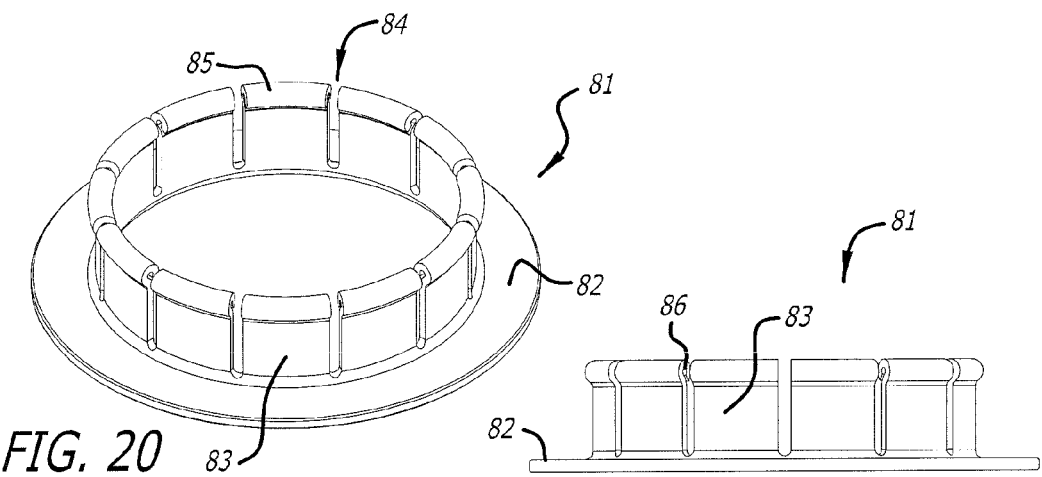

Another basket embodiment is shown in FIGS. 20 and 21. Here, basket 81 has a flat annular ring portion 82 with a plurality of integral spaced segments 83. Segments 83 are generally rectangular terminating in a ring 84. Ring 84 is formed of a plurality of spaced arcuate segments 85 separated by gaps 86. As seen, gaps 86 are elongated slots.

Figures 22, 23:
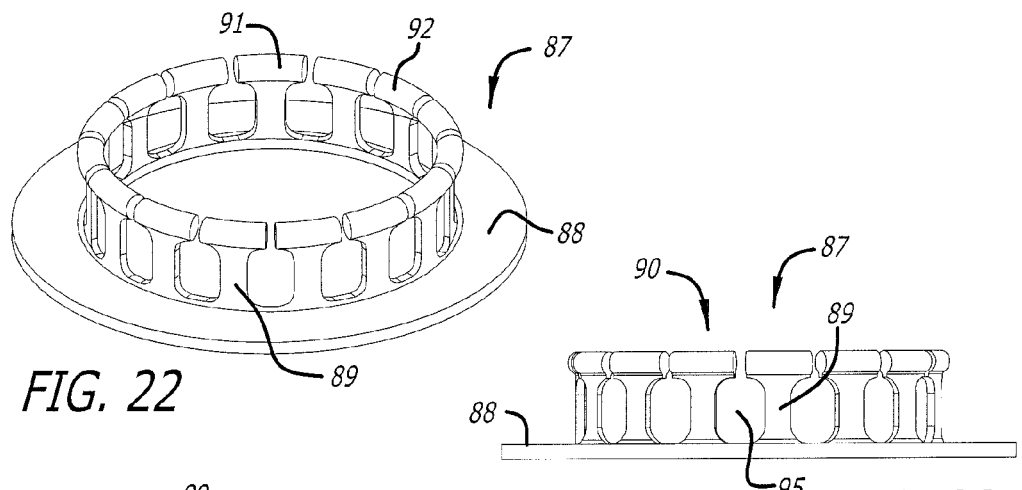

Another embodiment of the retaining basket is shown in FIGS. 22 and 23. Here, basket 87 has a flat annular ring portion 88 and a plurality of integral spaced segments 89. Segments 89 terminate in a ring 90 comprised of a plurality of spaced arcuate segments 91 separated by gaps 92. Gaps 92 communicate with generally oval-shaped cut-out openings 93 between adjacent segments 89.

Figures 24, 25:
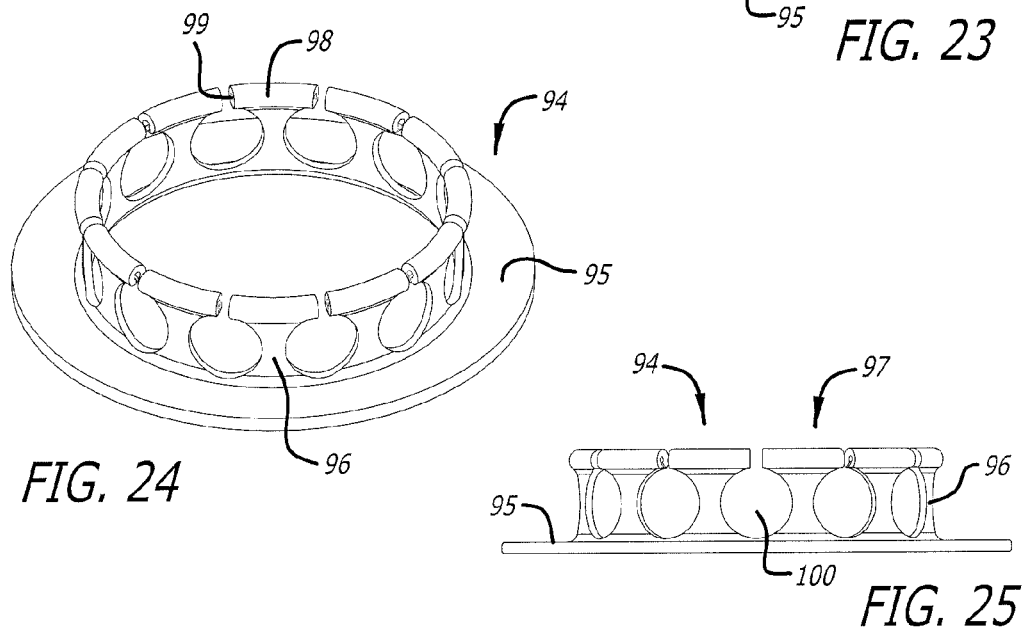

A final embodiment of the basket is shown in FIGS. 24 and 25. Here, basket 94 has a flat annular ring portion 95 with a plurality of spaced segments 96 terminating in a ring 97. Ring 97 is comprised of a plurality of arcuate segments 98 which may be crimped as shown separated by gaps 99. Gaps 99 communicate with generally circular cut-out openings 100 between adjacent segments 96.

The operation of all of the baskets in FIGS. 8 to 25 is identical to the operation of basket 12 of FIG. 1 and further discussion or elaboration is deemed unnecessary. It can be seen that there is disclosed an improved wedge collar assembly for a pull-type clutch assembly having the snap ring integral with the wedge collar. The segmented ring of the snap ring of the invention expands uniformly and cannot jump out of place.

Although a specific embodiment of the invention has been disclosed, along with various modifications of the basket 12, variations thereof may occur to an artisan and the scope of the invention should only be limited by the scope of the appended claims.

The invention claimed is:

1. A release mechanism for a pull-type clutch assembly, comprising:
   a throw-out bearing including an inner cylindrical portion extending in a direction axially inwardly of the clutch assembly;
   a retaining basket having a flat annular ring portion surrounding an opening receiving said cylindrical portion of said bearing therethrough, said basket having a ring connected to said ring portion with an inner and outer surface spaced from said annular portion, said ring being comprised of a segmented torus comprised of a plurality of spaced toroidal segments similar in length integrally interconnected to said annular portion by spaced connecting segments integral with said segmented torus and said annular portions, said spaced connecting segments extending perpendicular to said segmented torus and away from said bearing, said spaced connecting segments being separated from one another by cut-out portions;
   a pressure plate having a central opening receiving said basket therein, said pressure plate having a plurality of radially extending resilient fingers extending outwardly from said central opening;
   a clutch disk disposed adjacent said pressure plate being adapted to be mounted to a clutch disk coupled to the flywheel of a vehicle; and
   said bearing having an outwardly extending annular groove into which the inner surface of said segmented torus of said basket snap fits, and said pressure plate having an inwardly extending annular groove into which the outer surface of said segmented torus snap-fits.

2. The mechanism of claim 1 wherein said cut-out portions are generally oval in configuration.

3. In the mechanism of claim 2 wherein said toroidal segments of said ring are separated by gaps communicating with said cut-out portions.

4. The mechanism of claim 3 wherein 12 said toroidal segments and 12 said connecting segments are provided.

5. The mechanism of claim 1 wherein said basket is comprised of one piece of a resilient metal material.

6. The mechanism of claim 1 wherein said toroidal segments are separated by gaps and said cut-out portions are elongated slots communicating with said gaps.

7. The mechanism of claim 6 wherein said connecting segments are generally rectangular in configuration.

8. The mechanism of claim 1 wherein said toroidal segments are separated by a plurality of gaps and said cut-out portions are U-shaped in configuration communicating with a respective one of said gaps.

9. The mechanism of claim 1 wherein said toroidal segments are separated by gaps, said cut-out portions being generally oval having an elongated axis extending in a direction generally parallel to said ring portion.

10. The mechanism of claim 1 wherein said toroidal segments are separated by gaps, said cut-out portions comprising cut-out portions circular in configuration adjacent a cut-out portion in the configuration of an elongated generally rectangular slot.

11. The mechanism of claim 1 wherein said toroidal segments are separated by gaps, said cut-out portions being circular in configuration communicating with respective ones of said gaps.

12. In the mechanism of claim 11 wherein 12 toroidal segments and 12 cut-out portions are provided.

13. In the mechanism of claim 11 wherein 6 toroidal segments and 6 cut-out portions are provided.

14. In the mechanism of claim 1 wherein said toroidal segments are separated by gaps and said cut-out portions are generally rectangular elongated slots communicating with said gaps, said connecting segments being generally square-shaped.

15. The mechanism of claim 1 wherein said toroidal segments are separated by gaps, said cut-out portions being generally oval in configuration communicating with respective ones of said gaps, said connecting segments being generally rectangular in configuration separating said cut-out portions.

* * * * *